United States Patent
Boardman et al.

(10) Patent No.: US 6,461,272 B1
(45) Date of Patent: Oct. 8, 2002

(54) VEHICLE SYNCHRONIZATION ALGORITHM FOR DRIVELINE PROTECTION

(75) Inventors: Mark D. Boardman, Portage; Karen L. Marx, Clawson, both of MI (US)

(73) Assignee: Eaton Corporation, Cleveland, OH (US)

( * ) Notice: Subject to any disclaimer, the term of this patent is extended or adjusted under 35 U.S.C. 154(b) by 3 days.

(21) Appl. No.: 09/826,094

(22) Filed: Apr. 4, 2001

(51) Int. Cl.⁷ .............................................. B60K 41/18
(52) U.S. Cl. ........................................................ 477/91
(58) Field of Search ........................................... 477/91

(56) References Cited

U.S. PATENT DOCUMENTS

| | | | |
|---|---|---|---|
| 5,582,558 A | 12/1996 | Palmeri et al. | 477/109 |
| 5,743,143 A | 4/1998 | Carpenter et al. | 74/335 |
| 5,755,639 A | 5/1998 | Genise et al. | 477/111 |
| 5,894,758 A | 4/1999 | Walker | 74/335 |
| 5,989,155 A | 11/1999 | Wadas et al. | 477/111 |
| 6,015,366 A | 1/2000 | Markyvech et al. | 477/109 |
| 6,126,569 A | 10/2000 | Genise | 477/91 |
| 6,186,925 B1 | 2/2001 | Bellinger | 477/175 |

*Primary Examiner*—Dirk Wright
(74) *Attorney, Agent, or Firm*—Kevin M. Hinman; Howard D. Gordon

(57) ABSTRACT

A method/system for controlling an automated mechanical transmission system (10) utilized on a vehicle and having a manually operated master friction clutch operator (48). To protect from driveline damage due to dynamic clutch "popping," upon sensing dynamic vehicle conditions (OS >REF$_{VSPEED}$) and clutch (16) not engaged, transmission (14) engaged and THL>REF$_{THL}$, a controller (28) causes engine speed (ES) to be limited to a target value (ES$_T$) substantially equal to input shaft speed (IS).

14 Claims, 2 Drawing Sheets

VEHICLE SYNCHRONIZATION ALGORITHM FOR DRIVELINE PROTECTION

BACKGROUND OF THE INVENTION

1. Field of the Invention

The present invention relates to controls for partially automated vehicular transmission systems having an engine controller for controlling fueling of an internal combustion engine in response to command output signals from a system controller and a manually operated master friction clutch for drivingly connecting and disconnecting the engine from a transmission input shift. In particular, the present invention relates to a control for an automated vehicular transmission system of the type described which will sense manual disengagement of the master clutch during dynamic conditions with the transmission engaged and will automatically cause the engine to rotate at a speed substantially equal to the sensed or calculated speed of the transmission input shaft to minimize or eliminate shock due to rapid disengagement of the master clutch.

2. Description of the Related Art

Controls for automated mechanical transmission systems especially wherein dynamic shifting is accomplished while maintaining the master clutch engaged and or wherein the master clutch is manually controlled and is disengaged only for starting or stopping the vehicle, are known in the prior art, as may be seen by reference to U.S. Pat. Nos. 4,576,065; 4,916,979; 5,335,566; 5,425,689; 5,272,939; 5,479,345; 5,533,946; 5,582,069; 5,582,558; 5,620,392; 5,489,247; 5,490,063 and 5,509,867, the disclosure of which are incorporated herein by reference.

This problem, and a solution thereto, is addressed in U.S. Pat. No. 6,126,569.

The prior art systems with manually controlled clutch pedals also provided the opportunity for abuse of the driveline as the driver has the ability, when the vehicle is moving with the transmission engaged, to disengage the clutch, cause the engine to accelerate or decelerate using and then releasing (i.e. engaging) the clutch pedal. This possibly caused driveline component users to use components designed to withstand such abuse, creating over-designed and excessively expensive components.

BRIEF SUMMARY OF THE INVENTION

The control of the present invention provides a control for a vehicular automated, mechanical transmission system which will sense conditions indicative of potential dynamic abuse of the driveline due to disengaging and then re-engaging a manually controlled master friction clutch and will protect the vehicle from shocks due to such abuse.

The foregoing is accomplished in a system wherein operating conditions are sensed/determined and engine speed (ES) controlled by sensing vehicle dynamic conditions (i.e., if the vehicle ground speed is high (OS>REF), the transmission is engaged in a gear ratio, and if the master clutch is not fully engaged, then engine speed is controlled to substantially equal transmission input shaft speed (ES= IS=OS * GR).

The above control logic will minimize large driveline shocks caused by rapidly engaging ("popping") the master clutch at engine speeds not substantially synchronized to driveline speeds.

Accordingly, an improved control for at least partially automated mechanical transmission is provided which will minimize driveline shocks due to dynamic clutch "popping".

This and other objects and advantages of the present invention will become apparent from a reading of the following description of the preferred embodiment taken in connection with the attached drawings.

DETAILED DESCRIPTION OF THE INVENTION

Figure 1:
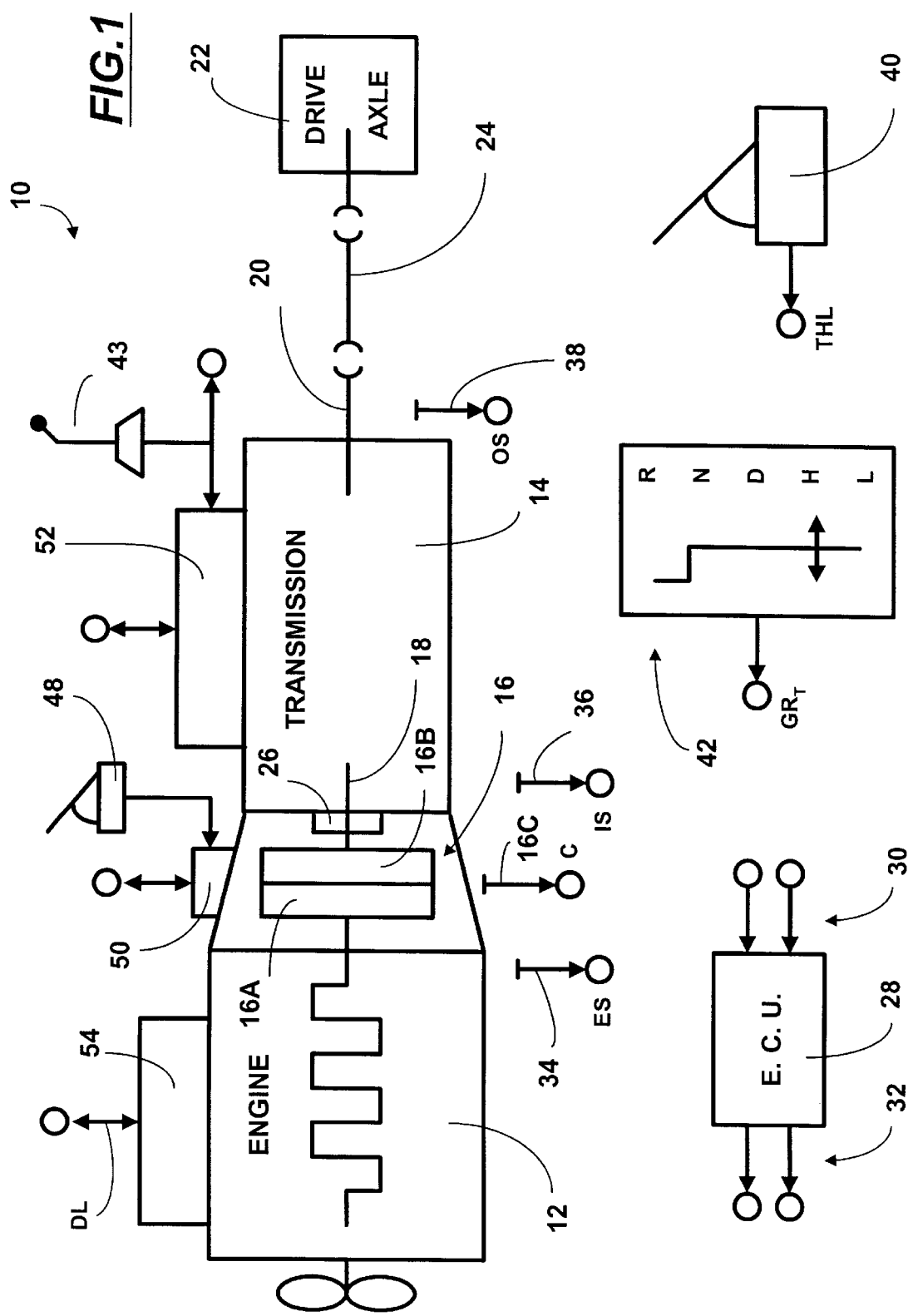
FIG. 1 is a schematic illustration, in block diagram format, of an automated mechanical transmission system utilizing the control of the present invention.

An at least partially automated mechanical transmission system intended for vehicular use is schematically illustrated in FIG. 1. The automated transmission system 10 includes a fuel-controlled engine 12 (such as a well-known diesel engine or the like), a multiple-speed, change-gear transmission 14, and a non-positive coupling 16 (such as a friction master clutch) drivingly interposed between the engine and the input shaft 18 of the transmission. The transmission 14 may be of the compound type comprising a main transmission section connected in series with a splitter- and/or range-type auxiliary section. Transmission of this type, especially as used with heavy-duty vehicles, typically have 6,7,8,9,10,12,13,16 or 18 forward speeds. Examples of such transmissions may be seen by reference to U.S. Pat. Nos. 5,390,561 and 5,737,978, the disclosures of which are incorporated herein by reference.

A transmission output shaft 20 extends outwardly from the transmission 14 and is drivingly connected with the vehicle drive axles 22, usually by means of a prop shaft 24. The illustrated master friction clutch 16 includes a driving portion 16A connected to the engine crankshaft/flywheel and a driven portion 16B coupled to the transmission input shaft 18 and adapted to frictionally engage the driving portion 16A. See U.S. Pat. Nos. 5,634,541; 5,450,934 and 5,908, 100. An upshift bake 26 (also known as an input shaft bake or inertia brake) may be used for selectively decelerating the rotational speed of the input shaft 18 for more rapid upshifting, as is well known. Input shaft or upshift brakes are known in the prior art, as may be seen in reference to U.S. Pat. Nos. 5,655,407 and 5,713,445.

A microprocessor-based electronic control unit (or ECU) 28 is provided for receiving input signals 30 and for processing same in accordance with predetermined logic rules to issue command output signals 32 to various system actuators and the like. Microprocessor-based controllers of this type are well known, and as example thereof may be seen by reference to U.S. Pat. No. 4,595,986.

System 10 includes a rotational speed sensor 34 for sensing rotational speed of the engine and providing an output signal (ES) indicative thereof, a rotational speed sensor 36 for sensing the rotational speed of the input-shaft 16 and providing an output signal (IS) indicative thereof and a rotational speed sensor 38 for sensing the rotational speed of the output shaft 20 and providing an output signal (OS) indicative thereof. A sensor 40 may be provided for sensing the displacement of the throttle pedal and providing an output signal (THL) indicative thereof. A shift control console 42 may be provided for allowing the operator to select an operating mode of the transmission system and for providing an output signal (GRT) indicative thereof. Alternatively, a shift lever 43 may be provided for shifting the transmission.

As is known, if the clutch is engaged, the rotational speed of the engine may be determined from the speed of the input shaft and/or the speed of the output shaft and the engaged transmission ratio (ES=IS=OS*GR).

System 10 also may include sensors for sensing operation of the vehicles foot brake (also called service brakes) and engine brakes, respectively, and for providing signals indicative thereof.

The master clutch 16 may be controlled by a clutch pedal 48 and possibly also by a clutch actuator 50 responding to output signals from the EUC 28 which may be overridden by operation of the manual clutch pedal. In the preferred embodiment, the clutch is manually controlled and used only to launch and stop the vehicle (see U.S. Pat Nos. 4,850,263; 5,272,939 and 5,425,689). The transmission 14 may include a transmission actuator 52, which responds to output signals from the ECU 28 and/or which sends input signals to the ECU 28 indicative of the selected position thereof. Shift mechanisms of this type, often of the so-called X-Y shifter type, are known in the prior art, as may be seen by reference to U.S. Pat Nos. 5,305,240 and 5,219,391. Actuator 52 may shift the main and/or auxiliary section of transmission 14. The engaged and disengaged (i.e., "not engaged") condition of clutch 16 may be sensed by a position sensor 16C or may be determined by comparing the speeds of the engine (ES) and the input shaft (IS).

Fueling of the engine is preferably controlled by an electronic engine controller 54, which accepts command signals form and/or provides input signals to the ECU 28. Preferably, the engine controller 54 will communicate with an industry standard data link DL which conforms to well-known industry protocols such as SAE J1922, SAE 1939 and/or ISO 11898. The ECU 28 may be incorporated within the engine controller 54.

Truck transmission with manual starting clutches provided the opportunity for abuse of the driveline by the driver. For example, the driver has the ability, dynamically and/or when starting the vehicle from rest, to fully depress the accelerator and then quickly releasing the clutch. This can be very damaging to the various components of the driveline. Therefore, driveline component manufactures have to design their components to withstand this abuse, creating over-designed, expensive components.

Automated mechanical transmissions with a manual clutch can prevent much of this abuse with the control algorithm of the present inventions, which does not allow a large differential between input shaft and engine speeds when engaging the clutch when dynamic conditions with the transmission engaged.

When the vehicle is in motion (OS>REF), the transmission is engaged (GR N) and the master clutch disengaged, engine speed will be caused to be substantially equal to driveline speed (ES=IS=OS*GR).

Alternatively, the logic may require that the throttle pedal be depressed (THL>REF>0%) and/or engine speed may be limited to no greater than approximately driveline speed. This will reduce or eliminate driveline damage form the clutch being re-engaged at too high an engine speed.

Figure 2:
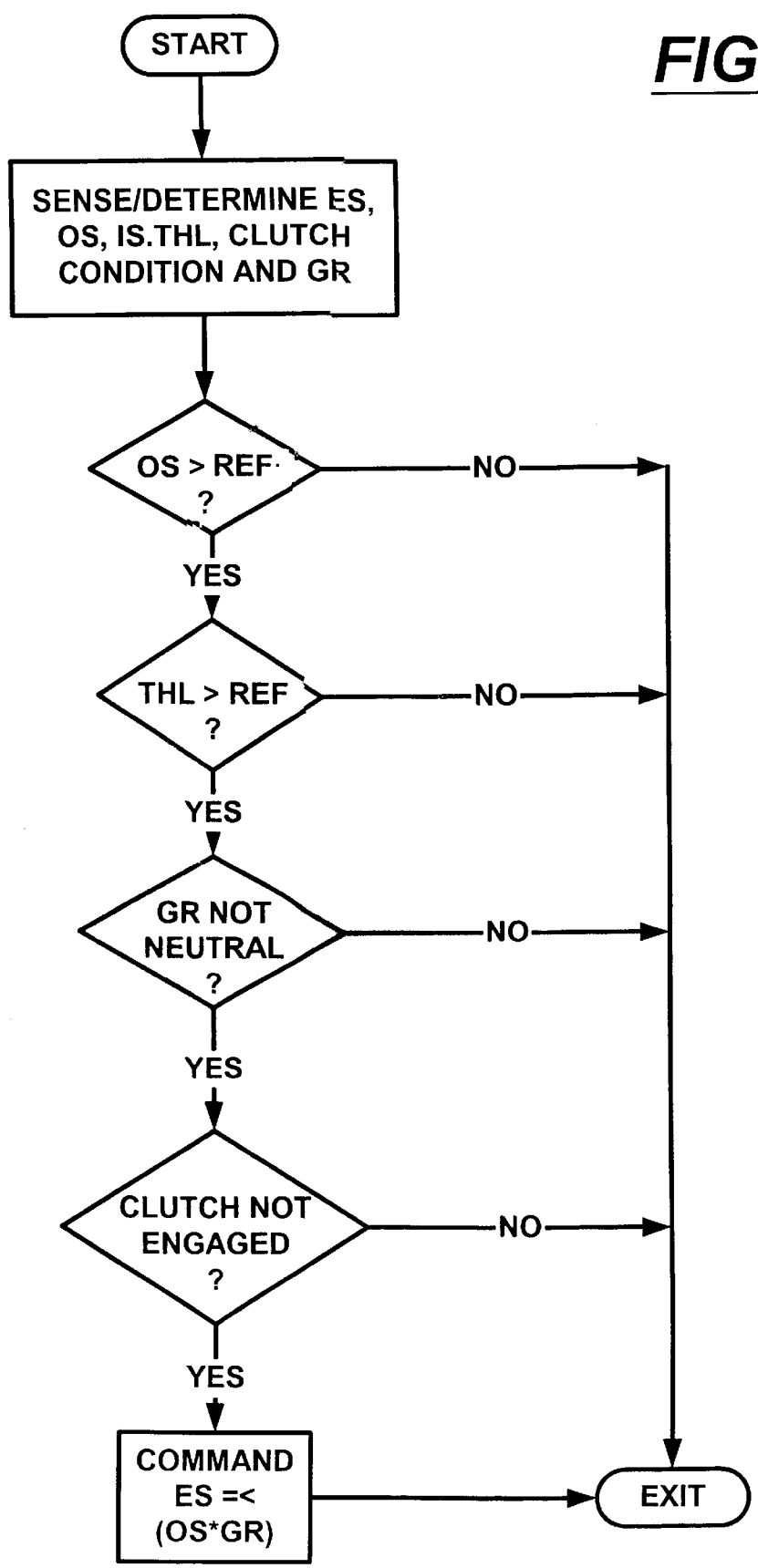
FIG. 2 is a schematic illustration, in flow chart format, of the control of the present invention.

The control of the present invention is shown in flow chart format in FIG. 2. The control logic of the present invention will prevent or minimize driveline shock caused by dynamic clutch "popping", allowing less expensive driveline components to be utilized.

Accordingly, it may be seen that an improved control system/method for controlling starting in an at least partially automated mechanical transmission system is provided.

Although the present invention has been described with a certain degree of particularity, it is understood that the description of the preferred embodiment is by way of example only and that numerous changes to form and detail are possible without departing form the spirit and scope of the invention as hereinafter claims.

We claim:

1. A method for controlling a vehicular automated transmission system (10) for a vehicle comprising a fuel-controlled engine (12), an engine fuel control device (54), a multiple-speed transmission (14) having an input shaft (18) coupled to the engine by a master friction clutch (16), a manually operated clutch operator (48) for selectively engaging and not engaging said master friction clutch, and a controller (28) for receiving input signals (30) including one or more of signals indicative of engine speed (ES), input shaft speed (IS), engaged gear ratio (GR), operator throttle setting (THL), clutch engagement and vehicle speed (OS), and to process said input signals in accordance with logic rules to issue command output signals (32) to transmission system actuators including said fuel control device, said method characterized by:

(1) determining if the transmission is engaged in a gear ratio;

(2) determining the engaged or not engaged condition of said master friction clutch;

(3) comparing the value of a signal (OS) indicative of vehicle speed and a speed reference value ($REF_{VSPEED}$); and (4) if (i) the transmission is engaged in a gear ratio, (ii) the master friction clutch is not engaged, and (iii) the value of the signal indicative of vehicle speed is greater than said speed reference value (OS<$REF_{VSPEED}$), then commanding fueling of the engine to cause engine speed to be no greater than an engine speed target value ($ES_T$) determined as a function of input shaft speed (IS).

2. The method of claim 1 wherein commanding fueling of the engine to cause engine speed to be no greater than an engine speed target value ($ES_T$) determined as a function of input shaft speed (IS) further requires that (iv) throttle position exceed a throttle reference value (THL>$REF_{THL}$).

3. The method of claim 1 wherein said master clutch is only manually engaged and not engaged.

4. The method of claim 1 wherein said engine speed target value ($ES_T$) is substantially equal to input shaft speed ($ES_T$=IS=(OS*GR)).

5. The method of claim 1 wherein said throttle reference value ($REF_{THL}$) is about 20–50% of full throttle displacement.

6. The method of claim 1 wherein said system (10) includes a position sensor (16C) for sensing the engaged and not engaged conditions of said master clutch.

7. The method of claim 1 wherein determining the engaged or not engaged conditions of said master clutch comprises comparing transmission input shaft speed (IS) to engine speed (ES).

8. A control system for controlling a vehicular automated mechanical transmission system (10) for a vehicle comprising a fuel-controlled engine (12), an engine fuel control device (54), a multiple-speed mechanical transmission (14) having an input shaft (18) connected to the engine by a master friction clutch (16), a manually operated clutch operator (48) for selectively engaging and not engaging said master friction clutch, and a controller (28) for receiving input signals (30) including one or more of signals indicative of throttle position (THL), engine speed (ES), input shaft speed (IS), engaged gear ratio (GR), clutch engaged or not engaged condition, and vehicle speed (OS), and to process said input signals in accordance with logic rules to issue command output signals (32) to transmission system actuators including said fuel control device and a transmission actuator (52) effective to shift said transmission, said control system characterized by said logic rules being effective, for (1) determining if the transmission is engaged in a gear ratio;
(2) determining the engaged or not engaged condition of said master friction clutch;
(3) comparing the value of signal (OS) indicative of vehicle speed and a speed reference value ($REF_{VSPEED}$); and
(4) if (i) the transmission is engaged in a gear ratio, (ii) the master friction clutch is not engaged, and (iii) the value of the signal indicative of vehicle speed is greater than said speed reference value ($OS<REF_{VSPEED}$), then commanding fueling of the engine to cause engine speed to be no greater than an engine speed target value ($ES_T$) determined as a function of input shaft speed (IS).

9. The system of claim 8 wherein said system (10) includes a position sensor (16C) for sensing the fully engaged and not fully engaged conditions of said master clutch.

10. The system of claim 8 wherein sensing the fully engaged or not fully engaged conditions of said master clutch comprises comparing transmission input shaft speed (IS) to engine speed (ES).

11. The system of claim 8 wherein commanding fueling of the engine to cause engine speed to be no greater than an engine speed target value ($ES_T$) determined as a function of input shaft speed (IS) further requires that (iv) throttle position exceed a throttle reference value ($THL>REF_{THL}$).

12. The system of claim 8 wherein said master clutch is only manually engaged and not engaged.

13. The system of claim 8 wherein said engine speed target value ($ES_T$) is substantially equal to input shaft speed ($ES_T=IS=(OS*GR)$).

14. The system of claim 1 wherein said throttle reference value ($REF_{THL}$) is about 20–50% of full throttle displacement.

* * * * *